(12) United States Patent
Terashima et al.

(10) Patent No.: US 8,755,108 B2
(45) Date of Patent: Jun. 17, 2014

(54) ELECTROPHORETIC DISPLAY DEVICE AND ELECTRONIC APPARATUS

(75) Inventors: Yasuhiro Terashima, Matsumoto (JP); Wataru Ito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 402 days.

(21) Appl. No.: 13/085,724

(22) Filed: Apr. 13, 2011

(65) Prior Publication Data
US 2011/0261032 A1    Oct. 27, 2011

(30) Foreign Application Priority Data
Apr. 22, 2010  (JP) .................................. 2010-098856

(51) Int. Cl.
*G02B 26/00*    (2006.01)
*G02F 1/167*    (2006.01)

(52) U.S. Cl.
CPC ..................................... *G02F 1/167* (2013.01)
USPC ......................................... 359/296; 345/107

(58) Field of Classification Search
USPC ............ 359/296; 345/68, 107, 204, 214, 698; 204/450, 600
See application file for complete search history.

(56) References Cited

U.S. PATENT DOCUMENTS

2007/0285385 A1*  12/2007  Albert et al. .................. 345/107
2008/0012121 A1*  1/2008  Hara ............................. 257/701

FOREIGN PATENT DOCUMENTS

| JP | A-2007-226019 | 9/2007 |
| JP | A-2007-114624 | 10/2007 |
| JP | A-2009-288499 | 12/2009 |

* cited by examiner

*Primary Examiner* — Ricky Mack
*Assistant Examiner* — Gary O'Neill
(74) *Attorney, Agent, or Firm* — Oliff PLC

(57) ABSTRACT

An electrophoretic display device includes: an electrophoretic layer which is sandwiched between a first substrate and a second substrate, wherein a disposition area of the electrophoretic layer is constituted by a display area and a sacrifice display area which is provided to surround the display area, and at the second substrate, a printed area which is set outside the display area in a plan view and overlaps an outer peripheral portion of the sacrifice display area is provided.

8 Claims, 7 Drawing Sheets

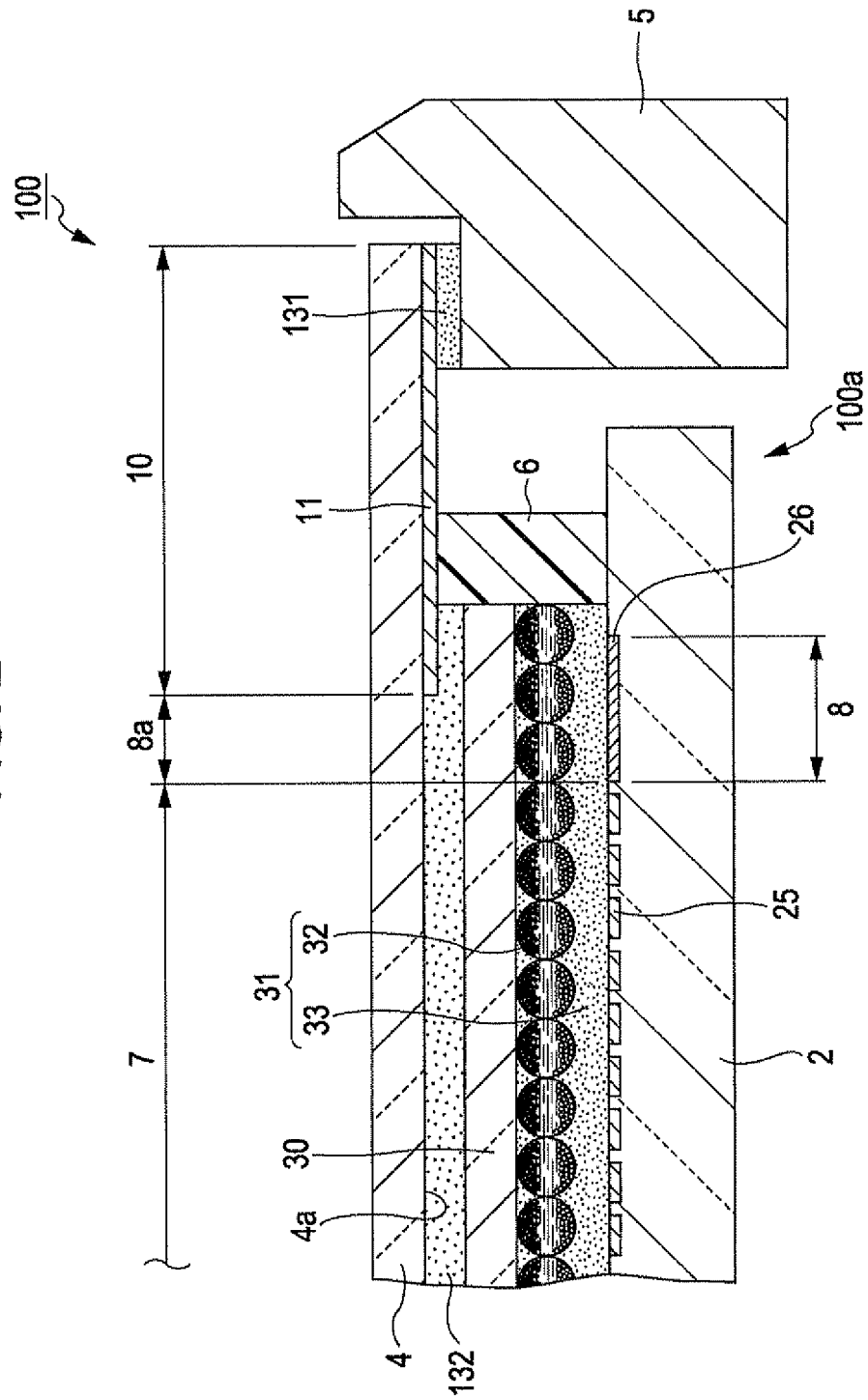

ELECTROPHORETIC DISPLAY DEVICE AND ELECTRONIC APPARATUS

CROSS-REFERENCE TO RELATED APPLICATION

This application is based on and claims priority from Japanese Patent Application No. 2010-098856, filed on Apr. 22, 2010, the contents of which are incorporated herein by reference.

BACKGROUND

The present invention relates to an electrophoretic display device and an electronic apparatus.

RELATED ART

At present, display devices such as liquid crystal devices are used in each field of mobile telephones, televisions, clocks, or the like and are being developed more and more, and development is rapidly proceeding of devices which have narrower frames, are slimmer, and are lighter weight in line with design or function needs of users. Further, along with the slimming of flat display devices, the need for a device capable of being bent or folded back, such as a flexible display device, is also growing. As the flexible display device, an electrophoretic display (EPD) capable of being made thinner and lighter, thereby having properties close to paper, is known.

As such an electrophoretic display device (hereinafter referred to as an EPD display device), there is an electrophoretic display device in which a laminated structure of a common substrate for driving, a transparent substrate, an adhesive layer for bonding a laminated body, and a glass cover protecting a display face is formed above the display face of an electrophoretic layer which becomes a display layer (refer to JP-A-2009-288499, for example). Also, in the EPD display device, the viewpoint of the design property is also an important factor for a better display appearance. Therefore, the technique of carrying out printing of a sacrifice layer or the like on a cover member (a second substrate) such as plastic or glass, which is provided above a display face, is also known (refer to JP-A-2007-226019, for example).

However, in the related art described above, since the display face is at a deep position with respect to a surface at which printing is carried out on the cover member due to the display layer, there is a problem in that the boundary between the printed surface and the display face is noticeable, whereby the design property of the display device is deteriorated and the appearance of the display face is also adversely affected. Also, there is a fear that a variation occurs in bonding position precision at the cover member and there is also a fear that a variation occurs in the printed position itself of the sacrifice layer or the like. Then, a display area is deviated from a design position, such that, especially in a case where the EPD display device is used in a small-size application, the appearance is significantly deteriorated even if there is minute position misalignment of the display area.

SUMMARY

An advantage of some aspects of the invention is that it provides an electrophoretic display device and an electronic apparatus, in which even in a case where position misalignment has occurred at the time of bonding of substrates, deterioration of the design property and the appearance is prevented.

According to a first aspect of the invention, there is provided an electrophoretic display device including: an electrophoretic layer which is sandwiched between a first substrate and a second substrate, wherein a disposition area of the electrophoretic layer is constituted by a display area and a sacrifice display area which is provided to surround the display area, and at the second substrate, a printed area which is set outside the display area in a plan view and overlaps an outer peripheral portion of the sacrifice display area is provided.

According to the electrophoretic display device of the above aspect of the invention, since the display area and the sacrifice display area are configured in the disposition area of the electrophoretic layer, it is possible to make the boundary portion (stepped portion) between the display area and the printed area unnoticeable and as a result, it is possible to improve the design property and the appearance of a display face. Also, even in a case where the bonding positions of the first substrate and the second substrate are out of alignment, since the sacrifice display area is provided, a curve does not arise in the display area, so that the deterioration of the design property and the appearance can be prevented.

Also, in regards to the electrophoretic display device, it is preferable that the printed area is provided at the face side of the second substrate, which faces the first substrate.

According to this configuration, since the printed area and the display area can be disposed to be close to each other, it is possible to further improve the appearance of the display area. Also, the printed area is provided at the inner face side of the second substrate, whereby the occurrence of a problem in which the printed area is scratched or abraded and removed can be prevented.

Also, in regards to the electrophoretic display device, it is preferable that the printed area is printed with ink which contains electrophoretic particles in the electrophoretic layer.

According to this configuration, it is possible to bring the appearances of the sacrifice display area and the printed area close to each other, so that it is possible to make the boundary portion between them less noticeable. Accordingly, it is possible to obtain an excellent design property and also improve the appearance of the display face.

Also, in regards to the electrophoretic display device, it is preferable that the printed area is printed with ink which contains electrophoretic particles in the electrophoretic element.

According to this configuration, it is possible to make the boundary portion between the sacrifice display area and the printed area unnoticeable, so that it is possible to obtain an excellent design property and also improve the appearance of the display face.

Also, in regards to the electrophoretic display device, it is preferable that the display area has a pixel structure in which a plurality of electrodes is regularly disposed and the sacrifice display area has the same pixel structure as that of the display area.

According to this configuration, since it becomes possible to perform the display of various patterns as the sacrifice display area, wide-ranging variations can be adopted as the printed area, whereby a display device having an excellent design property can be provided.

Also, in the electrophoretic display device, it is preferable that in a case where position misalignment of the central portion of the printed area and the central portions of the display area and the sacrifice display area has occurred, the pixel structure of each of the display area and the sacrifice display area is driven so as to make a portion of the display area function as the sacrifice display area and make a portion of the sacrifice display area function as the display area.

In this manner, even in a case where the bonding positions of the first substrate and the second substrate are out of alignment, it is possible to correct the positions of the central portion of the printed area and the central portions of the display area and the sacrifice display area by adjusting the upper, lower, right, and left areas of the sacrifice display area with respect to the display area.

According to a second aspect of the invention, there is provided an electronic apparatus provided with the electrophoretic display device described above.

According to the electronic apparatus according to the above aspect of the invention, since it is provided with the electrophoretic display device in which the design property and the appearance of the display face are excellent, an electronic apparatus having excellent display characteristics can be provided.

BRIEF DESCRIPTION OF THE DRAWINGS

The invention will be described with reference to the accompanying drawings, wherein like numbers reference like elements.

FIG. 2 is a diagram showing a cross-sectional configuration related to a main section of the electrophoretic display device.

DESCRIPTION OF EXEMPLARY EMBODIMENTS

Hereinafter, configurations related to embodiments of an electrophoretic display device and an electronic apparatus according to the invention will be described. In addition, in the respective drawings which are used in the following description, in order to make each member a recognizable size, the scale has been appropriately changed.

First Embodiment

Figure 1:
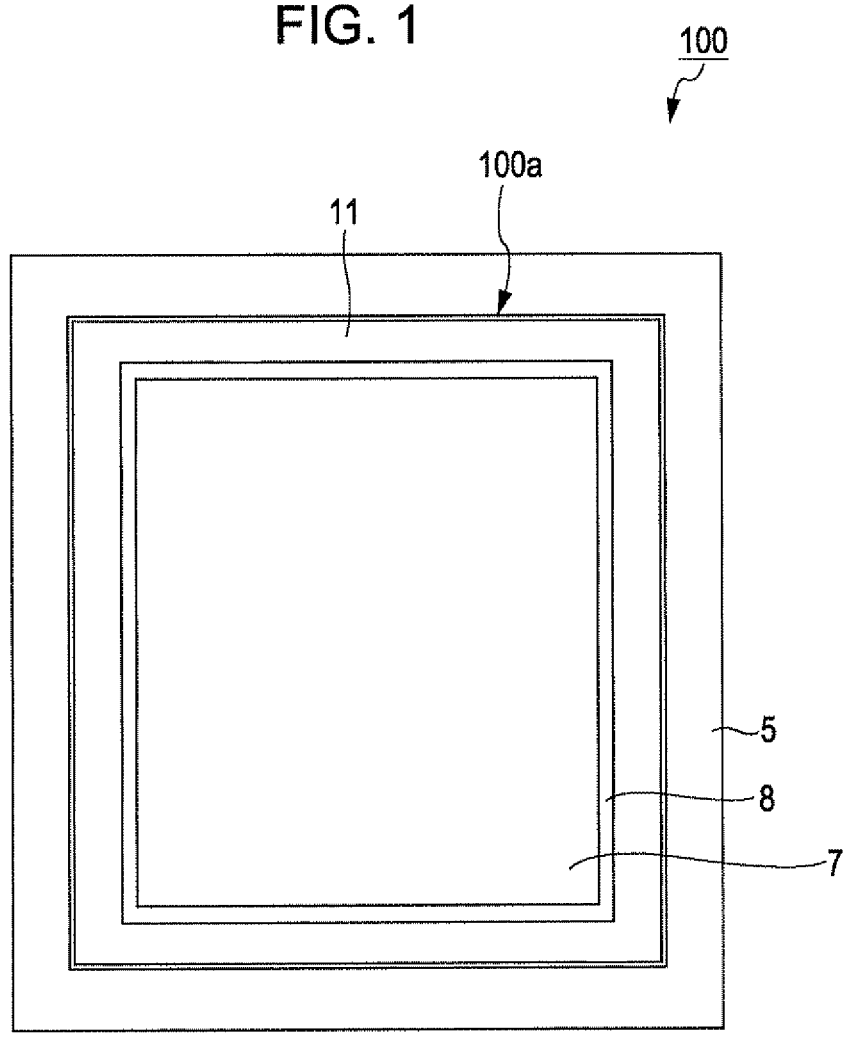
FIG. 1 is a diagram showing a planar configuration of an electrophoretic display device related to the first embodiment.

FIG. 1 is a plan view showing a configuration related to one embodiment of an electrophoretic display device and FIG. 2 is a diagram showing a cross-sectional configuration related to a main section of the electrophoretic display device.

As shown in FIG. 1, an electrophoretic display device 100 includes a panel section 100a and a casing section 5 which holds the panel section 100a. The panel section 100a includes an element substrate (a first substrate) 2, a transparent substrate 30, an electrophoretic layer 31 which is sandwiched in between these substrates 2 and 30, a glass substrate (a second substrate) 4, and a sealing member 6, as shown in FIG. 2.

The glass substrate 4 is bonded to the transparent substrate 30 through an adhesive layer 132. The sealing member 6 is disposed between the glass substrate 4 and the element substrate 2 so as to surround the electrophoretic layer 31. The glass substrate 4 is formed in a state where the planar shape thereof extends further than the element substrate 2, and is fixed to the casing section 5 through an adhesive layer 131 provided at the projecting portion. In this way, the bonded structure body of the element substrate 2 and the transparent substrate 30 with the electrophoretic layer 31 sandwiched in therebetween is held on the casing section 5 through the glass substrate 4.

The element substrate 2 is constituted using a base material having a thickness in the range of, for example, about 30 μm to 100 μm as a main body. As a constituent material of the element substrate 2 (the base material), for example, an inorganic substrate such as a glass substrate, a quartz substrate, a silicon substrate, or a gallium arsenic substrate, a plastic substrate (a resin substrate) which is composed of polyimide, polyethylene terephthalate (PET), polyethylene naphthalate (PEN), polymethylmethacrylate (PMMA), polycarbonate (PC), polyether sulfone (PES), aromatic polyester (liquid crystal polymer), or the like, or the like can be given.

The electrophoretic display device 100 has a display area 7 and a sacrifice display area 8 set in a disposition area of the electrophoretic layer 31. The display area 7 is an area in which a plurality of pixel electrodes (electrodes) 25 is arranged, for example, in a matrix form in a plan view, and a region where each pixel electrode 25 is formed becomes a pixel region and has a pixel structure 25a capable of displaying an image such as a still image or a moving image for each pixel region.

On the other hand, the sacrifice display area 8 is set so as to surround the display area 7. In the sacrifice display area 8, an electrode for sacrifice display (electrode) 26 is disposed. In addition, the sacrifice display area 8 is for constituting a sacrifice portion of the display area 7 without performing image display. The electrode for sacrifice display 26 related to this embodiment is formed so as to surround the outermost periphery of the plurality of pixel electrodes 25 which is disposed in the display area 7. In addition, the electrode for sacrifice display 26 does not need to be constituted from one sheet of electrode member, but may be constituted from a plurality of electrode members.

In the element substrate 2, a driving layer (not shown) which includes switching elements for driving the pixel electrodes 25 is provided at a position which approximately corresponds with the display area 7 in a plan view. Also, in the element substrate 2, a driving layer (not shown) which includes a switching element for driving the electrode for sacrifice display 26 is provided at a position which approximately corresponds with the sacrifice display area 8 in a plan view. In addition, in a case where the electrodes for sacrifice display 26 are constituted from a plurality of electrode members, the driving layer is provided at each of the electrodes for sacrifice display 26.

In this manner, in this embodiment, the electrode for sacrifice display 26 is made to be capable of being driven independently of the pixel electrodes 25. At the element substrate 2, a terminal (not shown) is provided, and a flexible substrate for external connection for enabling an electrical connection between it and an external device is connected to the terminal.

The transparent substrate 30 is a sheet having optical transparency, which holds the electrophoretic layer 31, and has a thickness in the range of about 25 μm to 200 μm (in this embodiment, a thickness of 125 μm). As a constituent material of the transparent substrate 30, for example, a material having high optical transparency, such as polyethylene terephthalate (PET), polyether sulfone (PES), or polycarbonate (PC), or the like can be given.

A common electrode (not shown) is formed over approximately the entire surface of the inner surface of the transparent substrate 30 and composed of an electrically conductive material having high optical transparency, such as ITO, for example. The common electrode is made such that voltage is applied between the common electrode and the pixel electrodes 25 and the electrode for sacrifice display 26. The common electrode is in a state where it is electrically connected to the element substrate 2 side through upper and lower conduction materials (not shown). Each of the upper and lower conduction materials is composed of, for example, an anisotropic conductive film, an anisotropic conductive sheet, or the like.

As a material of the sealing member 6, for example, a resin material such as epoxy resin can be given. By adopting a configuration in which the sealing member 6 shields the glass substrate 4 and the electrophoretic layer 31 in this way, the occurrence of a problem in which moisture infiltrates into the electrophoretic layer 31 can be more reliably prevented.

As the glass substrate 4, a substrate having high optical transparency and excellent flatness and being resistant to scratches is used and, for example, may be exemplified by inorganic glass, crystal glass, sapphire glass, acrylic glass, or the like. The glass substrate 4 covers the transparent substrate 30, thereby improving the mechanical strength of the panel section 100*a*. Also, the glass substrate 4 is configured so as to cover the electrophoretic layer 31 together with the element substrate 2 and the transparent substrate 30, whereby infiltration of moisture into the electrophoretic layer 31 is more reliably prevented.

The electrophoretic layer 31 includes a plurality of microcapsules 32 and an adhesive layer 33. The adhesive layer 33 is an adhesive agent doubling as a binder. As the adhesive layer 33, it is preferable to use, for example, an adhesive agent having an excellent affinity for a capsule wall film of the microcapsule 32 and excellent adhesion properties to the pixel electrodes 25.

The microcapsule 32 is an approximately spherical capsule in which electrophoretic dispersion liquid is enclosed, and the diameters of the respective capsules are approximately the same (30 μm to 100 μm). As a material constituting the capsule wall film of the microcapsule 32, a gum arabic-gelatin composite film, or a compound such as urethane resin, urea resin, or urea-formaldehyde resin can be given. The electrophoretic dispersion liquid enclosed in the microcapsule 32 is composed of a plurality of electrophoretic particles and a liquid phase dispersion medium for dispersing the electrophoretic particles.

As the liquid phase dispersion medium, water, alcoholic solvent, various esters, ketones, aliphatic hydrocarbon, alicyclic hydrocarbon, aromatic hydrocarbon, halogenated hydrocarbon, carboxylate, other various oils, or the like can be used alone, or a combination of a surfactant or the like with a mixture of them alone can be used.

As the electrophoretic particles, organic or inorganic particles (a polymer or colloid) having properties such that they move in the liquid phase dispersion medium by electrophoresis caused by a difference in electric potential can be used. Specifically, one or two or more types of a black pigment such as carbon black or aniline black, a white pigment such as titanium dioxide, a yellow pigment such as an azo pigment of monoazo or isoindolinone, a red pigment such as an azo pigment of monoazo or quinacridone red, a blue pigment such as phthalocyanine blue, a green pigment such as phthalocyanine green, or the like can be used. To these pigments, an electrolyte, a surfactant, a charge controlling agent which is composed of particles of metallic soap, resin, rubber, oil, varnish, a compound, or the like, a dispersant such as a titanium-based coupling agent, an aluminum-based coupling agent, or a silane-based coupling agent, a lubricant, a stabilizer, or the like can be added, as necessary.

Two types of electrophoretic particles, for example, titanium dioxide which is a white pigment and carbon black which is a black pigment, are enclosed in the microcapsule 32, and one side is negatively charged, while the other side is positively charged. Of course, other electrophoretic particles may be used and a configuration may be made such that only one type of electrophoretic particles are used and display can be performed by making it migrate to the common electrode side or the pixel electrode side.

Also, a printed area 11 is set on an inner surface 4*a* side of the glass substrate 4 so as to follow an outer peripheral portion thereof. In this embodiment, the printed area 11 constitutes an outer frame portion 10 of the panel section 100*a*. The printed area 11 is set outside the display area 7 in a plan view and also set so as to overlap an outer peripheral portion of the sacrifice display area 8. Here, the portion of the sacrifice display area 8, which is disposed between the printed area 11 and the display area 7, constitutes a peripheral sacrifice portion 8*a* of the display area 7. Specifically, the sacrifice display area 8 is made so as to display, for example, a black color as the peripheral sacrifice portion 8*a* by applying voltage to the electrophoretic layer 31 through the electrode for sacrifice display 26. In addition, in this embodiment, printing is performed with black ink which contains the electrophoretic particles of the electrophoretic layer 31 constituting the sacrifice display area 8. Therefore, in this embodiment, since the peripheral sacrifice portion 8*a* (the sacrifice display area 8) and the outer frame portion 10 (the printed area 11) are made to be the same black color, they are integrated with each other, thereby constituting an outer periphery design of the panel section 100*a*.

In this embodiment, by providing the sacrifice display area 8 between the printed area 11 and the display area 7, the boundary portion (stepped structure) between the printed area 11 and the display area 7 becomes unnoticeable. Also, in this embodiment, by disposing the printed area 11 at the inner surface 4*a* side of the glass substrate 4, the distance between the printed area 11 and the display area 7 and the sacrifice display area 8 (the electrophoretic layer 31) becomes shorter. Accordingly, a step between the printed area 11 and the display area 7 becomes small and as a result, the appearance of the display face is improved. Also, by setting the printed area 11 at the inner surface 4*a* side of the glass substrate 4, the occurrence of a problem in which the printed area 11 is scratched or abraded is prevented.

According to the electrophoretic display device 100 related to this embodiment, by providing the sacrifice display area 8 between the display area 7 and the printed area 11, the boundary portion (stepped structure) between the display area 7 and the printed area 11 becomes unnoticeable. Accordingly, the design properties and appearances of the display faces (the surface of the glass substrate 4) of the display area 7 and the outer periphery design can be improved.

Incidentally, in the case of manufacturing the electrophoretic display device 100, bonding the glass substrate 4 and the transparent substrate 30 in a state with no misalignment is difficult due to problems with alignment precision or the like. If a substrate bonding device with high alignment precision is used, there is a problem that the cost of an electrophoretic display device 100 increases.

On the other hand, according to the electrophoretic display device 100 related to this embodiment, as will be described later, even in a case where position misalignment has occurred in bonding of the substrates 4 and 30, the design property and the appearance are not deteriorated.

Figure 3A:
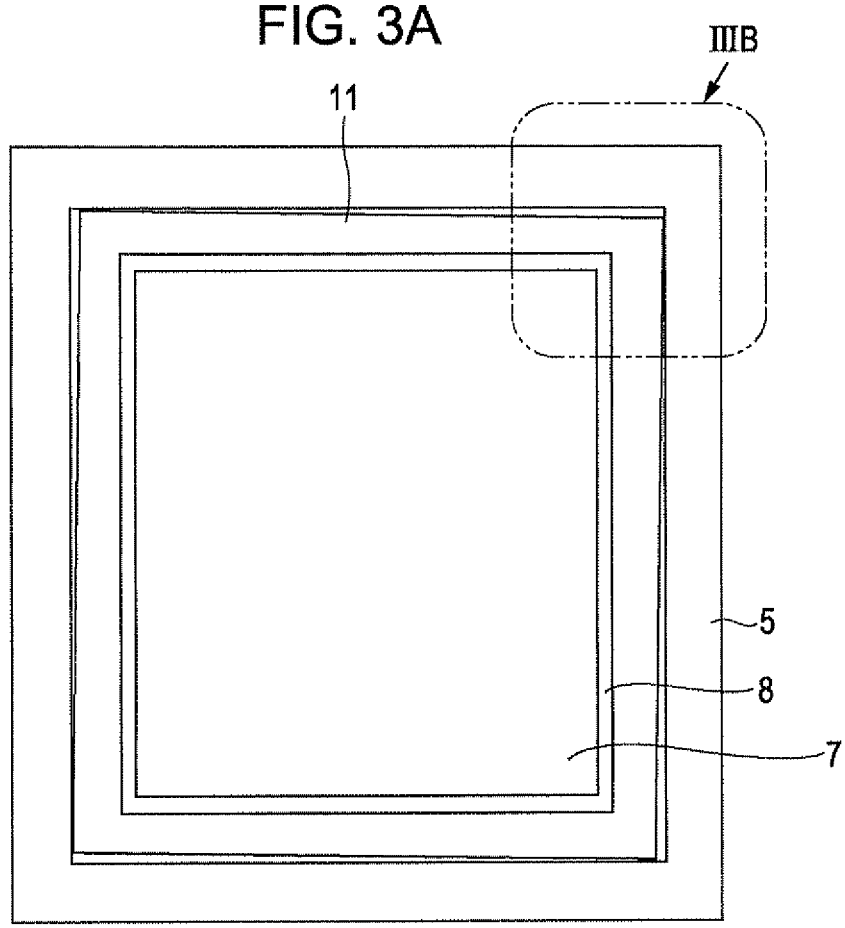
FIGS. 3A and 3B are diagrams for describing the effects of the electrophoretic display device related to the embodiment.
Figure 3B:
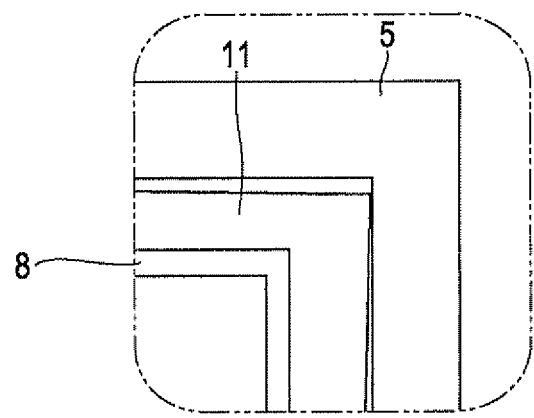

Here, FIG. 3A shows a case where bonding misalignment has occurred between the glass substrate 4 and the transparent substrate 30 and FIG. 3B shows an enlarged view of a main portion.

In the electrophoretic display device 100 related to this embodiment, as shown in FIGS. 3A and 3B, in a case where position misalignment has occurred when bonding the glass substrate 4 and the transparent substrate 30, the printed area 11 is bent and disposed with respect to the display area 7, but the peripheral sacrifice portion 8a is reliably formed by the sacrifice display area 8 provided between the display area 7 and the printed area 11. Accordingly, the occurrence of a problem such that the design property and appearance of the electrophoretic display device 100 is deteriorated can be prevented without the influence of a curve on the display area 7 itself.

Second Embodiment

Figure 4:
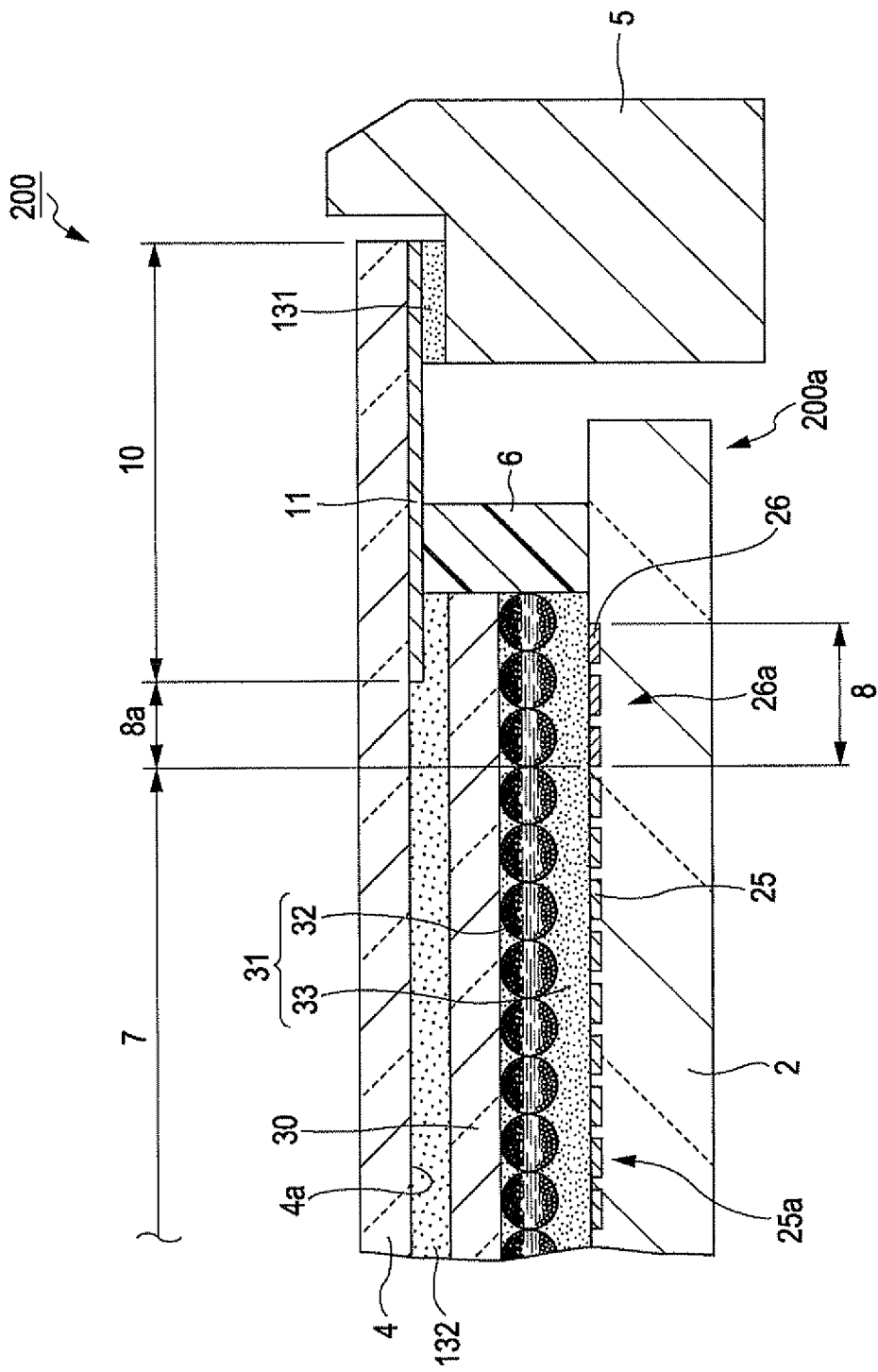
FIG. 4 is a diagram showing a cross-sectional configuration of an electrophoretic display device related to the second embodiment.

Next, a configuration related to the second embodiment of the electrophoretic display device will be described. A difference between the configurations related to this embodiment and the first embodiment is to adopt the same pixel structure as the display area 7 for the sacrifice display area. Here, the same pixel structure means that as shown in FIG. 4, a plurality of electrodes for sacrifice display 26 each having approximately the same size as the pixel electrode 25 is disposed approximately in a matrix form at the sacrifice display area 8 and a region where each electrode for sacrifice display 26 is formed becomes a pixel region and has a pixel structure 26a capable of displaying various images for each pixel region. A driving layer (not shown) which includes a switching element is provided at each of the electrodes for sacrifice display 26 and the electrode for sacrifice display 26 can be driven independently of the pixel electrode 25. In addition, in other respects, the configurations are the same. Therefore, the same configurations and the same members are denoted by the same symbols as that of the first embodiment and a detailed explanation thereof is omitted or simplified.

Figure 5A:
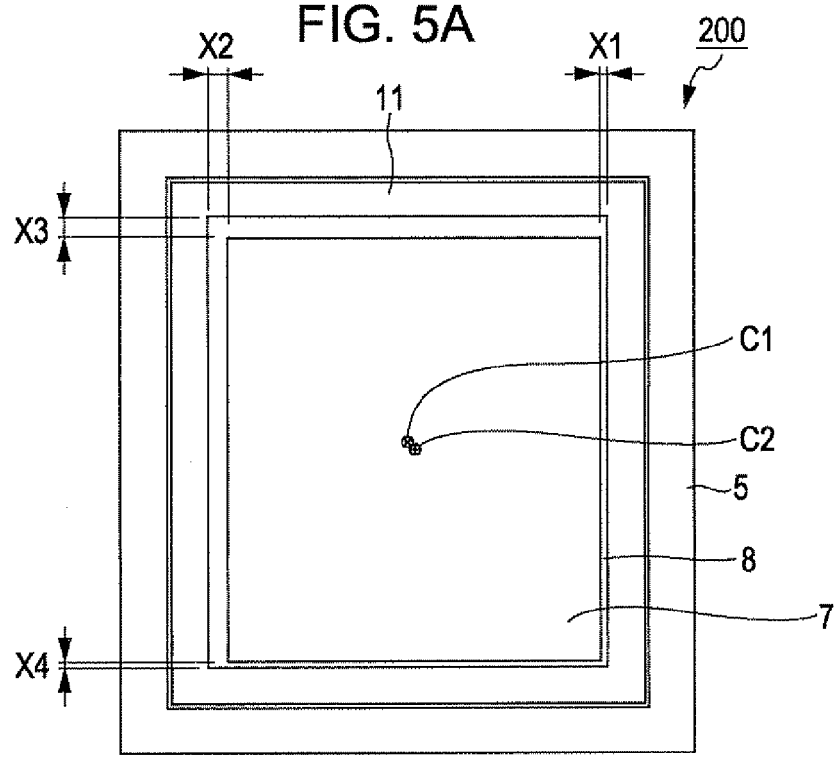
FIGS. 5A and 5B are diagrams for describing the effects of the electrophoretic display device related to the embodiment.

The effects of an electrophoretic display device 200 related to this embodiment will be described with reference to FIGS. 5A and 5B. In the following explanation, when bonding the glass substrate 4 and the transparent substrate 30, it is assumed that misalignment has occurred in the electrophoretic display device 200 at the time of substrate bonding as shown in FIG. 5A. In addition, in FIG. 5A, the symbol C1 indicates the center position of the panel section 100a which is described by the printed area 11 and the symbol C2 indicates a design center position in the display area 7.

Figure 5B:
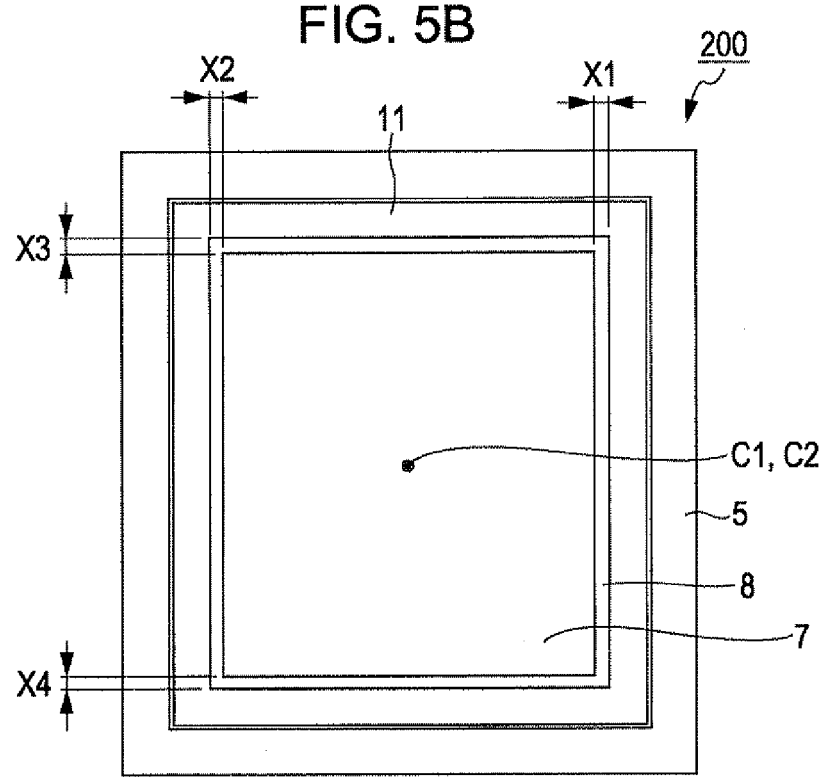

Here, in FIGS. 5A and 5B, the right sacrifice portion width of the peripheral sacrifice portion 8a, which is set by the sacrifice display area 8 and the printed area 11, is set to be X1, the left sacrifice portion width is set to be X2, the upper sacrifice portion width is set to be X3, and the lower sacrifice portion width is set to be X4. In the state shown in FIG. 5A, the respective widths of the peripheral sacrifice portion 8a are in the relationships of X2>X1 and X3>X4. In a case where such position misalignment has occurred, the amount of position misalignment between C1 and C2 is measured in advance by using an imaging section such as a CCD camera, for example, and the amount of position misalignment is stored in a memory in a driving control section (not shown) in the electrophoretic display device 200.

The electrophoretic display device 200 related to this embodiment performs adjustment such that the widths X1 to X4 of the peripheral sacrifice portion 8a become equal to each other in all four directions, on the basis of the above-mentioned amount of position misalignment. Specifically, in the electrophoretic display device 200, the right peripheral end portion of the display area 7 shown in FIG. 5A is made to function as the sacrifice display area 8. As a result, the width X1 of the peripheral sacrifice portion 8a can be expanded. On the other hand, the portion of the sacrifice display area 8, which follows the left peripheral end portion of the display area 7 is made to function as the display area 7. As a result, the width X1 of the peripheral sacrifice portion 8a can be expanded.

Similarly, the portion of the sacrifice display area 8, which follows the upper peripheral end portion of the display area 7 is made to function as the display area 7. As a result, the width X3 of the peripheral sacrifice portion 8a can be narrowed. On the other hand, the lower peripheral end portion of the display area 7 is made to function as the sacrifice display area 8. As a result, the width X4 of the peripheral sacrifice portion 8a can be expanded.

In this manner, according to the electrophoretic display device 200 related to this embodiment, even in a case where a bonding position of the glass substrate 4 is out of alignment, by respectively driving the pixel structure (the pixel electrodes 25) forming the display area 7 and the pixel structure (the electrodes for sacrifice display 26) forming the sacrifice display area 8, it is possible to make the widths X1 to X4 of the peripheral sacrifice portion 8a equal to each other. Accordingly, a device or the like for performing a bonding process of the glass substrate 4 with high precision may be made unnecessary, so that the manufacturing cost of the electrophoretic display device 200 can be reduced.

Also, since the sacrifice display area 8 has the same pixel structure as that of the display area 7, it is possible to perform various displays. That is, since the sacrifice display area 8 can perform the same display as the printed area 11 in which various printings are carried out, the peripheral sacrifice portion 8a (the sacrifice display area 8) and the outer frame portion 10 (the printed area 11) are integrated with each other, thereby allowing various designs to be adopted as an outer periphery design in the panel section 200a. Also, similarly to the above-described embodiment, it is possible to make the boundary portion (stepped portion) between the display area 7 and the printed area 11 unnoticeable. Further, wide-ranging variations can be adopted as the printed area 11, whereby a display device in which the design property of the display face (the surface of the glass substrate 4) is excellent can be provided.

Electronic Apparatuses

Next, cases where the electrophoretic display devices 100 and 200 of the above-described embodiments are applied to electronic apparatuses will be described.

Figure 6:
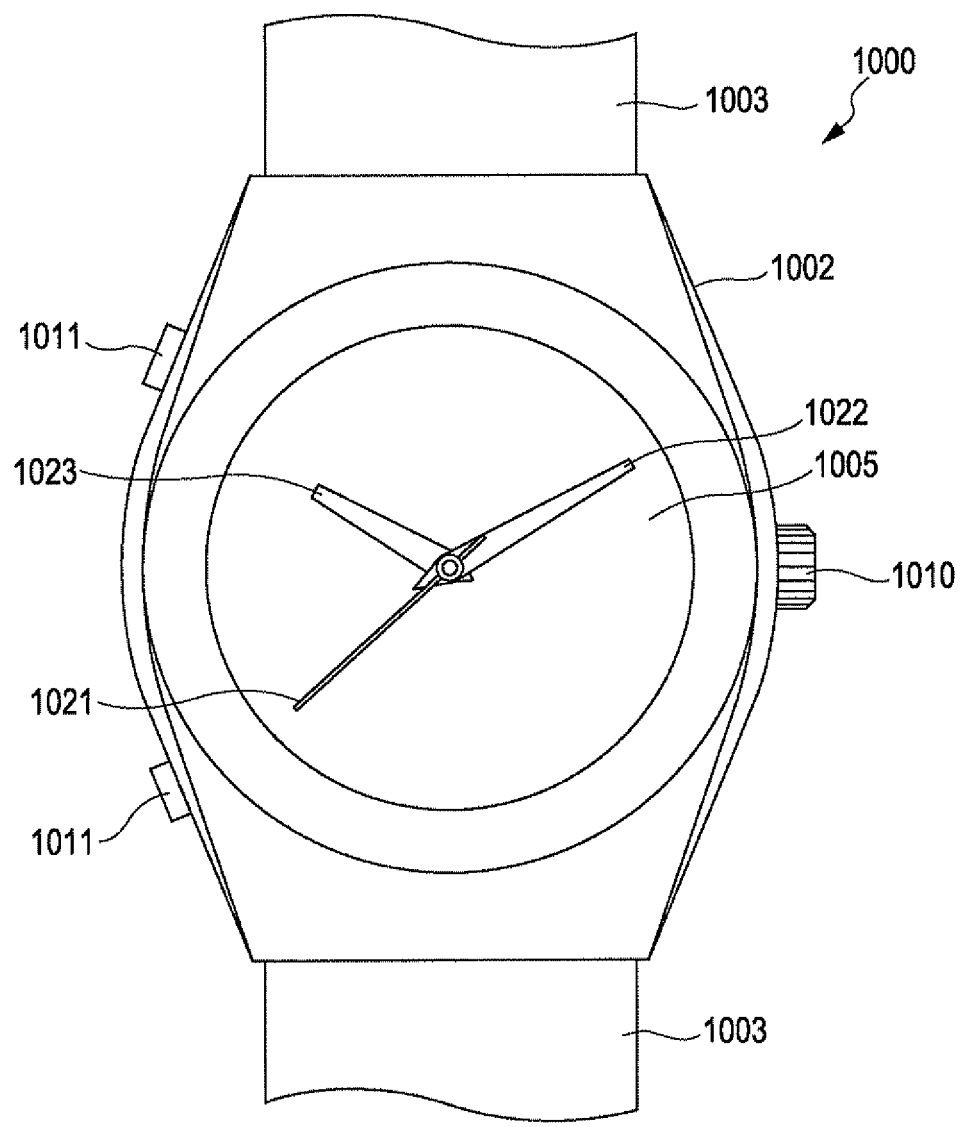
FIG. 6 is a view showing one example of an electronic apparatus.

FIG. 6 is a front view of a wrist watch 1000. The wrist watch 1000 is provided with a watch case 1002 and a pair of bands 1003 connected to the watch case 1002.

At the front of the watch case 1002, a display section 1005 which is composed of the electro-optical device of each embodiment described above, a second hand 1021, a minute hand 1022, and an hour hand 1023 are provided. At the sides of the watch case 1002, a winding crown 1010 and an operation button 1011, which serve as operators, are provided. The winding crown 1010 is connected to a winding stem (not shown) which is provided in the inside of the case, and provided so as to be capable of being pushed and pulled in multiple stages (for example, two stages) and be rotatable together with the winding stem. At the display section 1005, an image which serves as a background, a character string such as a date or a time, the second hand, the minute hand, the hour hand, or the like can be displayed.

Figure 7:
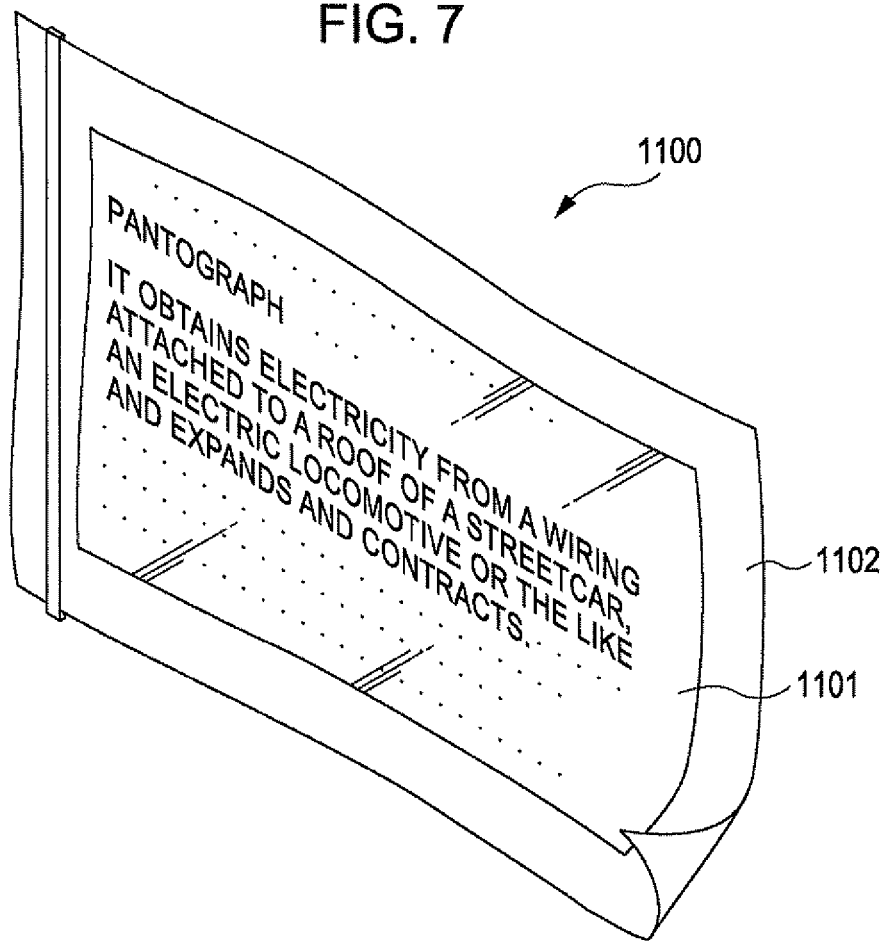
FIG. 7 is a view showing one example of an electronic apparatus.

FIG. 7 is a perspective view showing the configuration of an electronic paper 1100. The electronic paper 1100 has the electro-optical device of each of the above-described embodiments at a display area 1101. The electronic paper 1100 has flexibility and is constituted to have a main body 1102 composed of a rewritable sheet having texture and pliability similar to traditional paper. In the electronic paper 1100, also with respect to the element substrate 2 constituting the electrophoretic display device 100, a material having flexibility is used.

Figure 8:
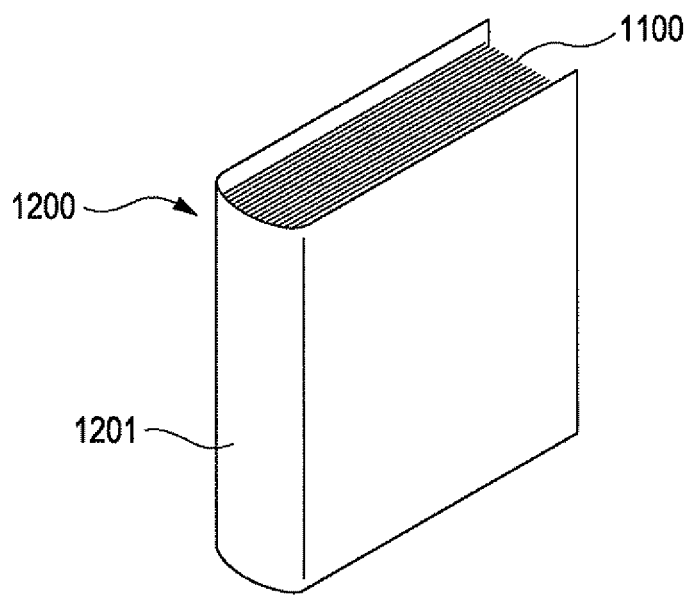
FIG. 8 is a view showing one example of an electronic apparatus.

FIG. 8 is a perspective view showing the configuration of an electronic notebook 1200. The electronic notebook 1200 has a configuration in which plural sheets of electronic papers 1100 described above are bundled and sandwiched in between covers 1201. The cover 1201 is provided with a display data input section (not shown) which inputs display data which is sent from an external device, for example. Accordingly, it is possible to perform changing or updating of display content in accordance with the display data in a state where the electronic papers remain bundled.

Regarding the wrist watch 1000, the electronic paper 1100, and the electronic notebook 1200, since they are provided with the electrophoretic display device 100 or 200 according to the invention, electronic apparatuses provided with a display face having excellent design property and appearance are obtained.

In addition, the above-described electronic apparatuses are to exemplify the electronic apparatuses according to the invention and to not limit the technical scope of the invention. The electro-optical device according to the invention can also be suitably used in display sections of electronic apparatuses such as mobile telephones and portable audio apparatuses, for example.

The preferred embodiments of the invention have been described above with reference to the accompanying drawings. However, it is needless to say that the invention is not limited to such examples. It will be apparent to those skilled in the art that various change examples or modification examples can be contemplated within the scope of the technical idea stated in the appended claims, and it is to be understood that these examples naturally also belong to the technical scope of the invention.

What is claimed is:

1. An electrophoretic display device comprising:
   an electrophoretic layer which is sandwiched between a first substrate and a second substrate,
   wherein a disposition area of the electrophoretic layer is constituted by a display area and a sacrifice display area which is provided to surround the display area, and
   at the second substrate, a printed area which is set outside the display area in a plan view and overlaps an outer peripheral portion of the sacrifice display area is provided,
   wherein in a case where position misalignment of the central portion of the printed area and the central portions of the display area and the sacrifice display area has occurred, the pixel structure of each of the display area and the sacrifice display area is driven so as to make a portion of the display area function as the sacrifice display area and make a portion of the sacrifice display area function as the display area.

2. The electrophoretic display device according to claim 1, wherein the printed area is provided at the face side of the second substrate, which faces the first substrate.

3. An electronic apparatus provided with the electrophoretic display device according to claim 2.

4. The electrophoretic display device according to claim 1, wherein the printed area is printed with ink containing electrophoretic particles of the electrophoretic layer.

5. An electronic apparatus provided with the electrophoretic display device according to claim 4.

6. The electrophoretic display device according to claim 1, wherein the display area has a pixel structure in which a plurality of electrodes is regularly disposed, and the sacrifice display area has the same pixel structure as that of the display area.

7. An electronic apparatus provided with the electrophoretic display device according to claim 6.

8. An electronic apparatus provided with the electrophoretic display device according to claim 1.

* * * * *